US 8,806,035 B2

(12) United States Patent
Gargi

(10) Patent No.: US 8,806,035 B2
(45) Date of Patent: Aug. 12, 2014

(54) TRANSFER OF CONTROL IN DIGITAL CONTENT ACCESS SESSIONS

(75) Inventor: Ullas Gargi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 975 days.

(21) Appl. No.: 11/128,080

(22) Filed: May 12, 2005

(65) Prior Publication Data

US 2006/0259631 A1 Nov. 16, 2006

(51) Int. Cl.
G06F 15/16 (2006.01)
G06F 15/173 (2006.01)

(52) U.S. Cl.
USPC .......................................... 709/229; 709/223

(58) Field of Classification Search
USPC .................. 709/203, 212, 217, 232, 223–229
See application file for complete search history.

(56) References Cited

U.S. PATENT DOCUMENTS

| 7,047,402 | B2 * | 5/2006 | Vicard et al. ........................ 713/1 |
| 7,051,119 | B2 * | 5/2006 | Shafron et al. ................. 709/248 |
| 7,103,099 | B1 * | 9/2006 | Paz et al. .................. 375/240.03 |
| 7,119,582 | B2 * | 10/2006 | Adkisson ............................ 327/3 |
| 7,228,332 | B2 * | 6/2007 | Rust ............................... 709/204 |
| 7,277,408 | B2 * | 10/2007 | Sorsa ............................. 370/328 |
| 7,287,054 | B2 * | 10/2007 | Lee et al. ........................ 709/204 |
| 7,337,219 | B1 * | 2/2008 | Meenan et al. ................ 709/220 |
| 7,340,631 | B2 * | 3/2008 | Adkisson ........................ 713/400 |
| 7,382,847 | B2 * | 6/2008 | Adkisson et al. .............. 375/371 |
| 7,441,000 | B2 * | 10/2008 | Boehringer et al. ........... 709/203 |
| 7,899,915 | B2 * | 3/2011 | Reisman ........................ 709/228 |
| 8,559,171 | B2 * | 10/2013 | Cummins .................... 361/679.41 |
| 2002/0032731 | A1 * | 3/2002 | Qian et al. ..................... 709/204 |
| 2002/0198941 | A1 * | 12/2002 | Gavrilescu et al. ............ 709/205 |
| 2003/0190138 | A1 * | 10/2003 | Yuen et al. ....................... 386/46 |
| 2004/0054728 | A1 * | 3/2004 | Rust ............................... 709/205 |
| 2004/0133629 | A1 * | 7/2004 | Reynolds et al. .............. 709/202 |
| 2004/0222983 | A1 * | 11/2004 | Kakemura ..................... 345/204 |
| 2005/0028208 | A1 * | 2/2005 | Ellis et al. ........................ 725/58 |
| 2007/0208808 | A1 * | 9/2007 | Rust ............................... 709/204 |
| 2012/0057842 | A1 * | 3/2012 | Caligor et al. ................. 386/201 |
| 2013/0061273 | A1 * | 3/2013 | Reisman ......................... 725/86 |
| 2013/0073738 | A1 * | 3/2013 | Reisman ........................ 709/227 |

OTHER PUBLICATIONS

"MARGI Wireless Presentations Technology," http://www.margi.com/wptg/index.htm.

* cited by examiner

Primary Examiner — Sargon Nano

(57) ABSTRACT

An exemplary method for transferring control during multiple digital content access sessions comprises initiating a first session for a first client, initiating a second session for a second client, receiving a request from the second client to obtain control over the first session, and enabling the second client to obtain control by synchronizing the first and second sessions and removing control capabilities from the first session.

30 Claims, 8 Drawing Sheets

TRANSFER OF CONTROL IN DIGITAL CONTENT ACCESS SESSIONS

BACKGROUND

In a network environment, multiple clients can concurrently access digital content using different devices. For example, in a digital home entertainment system, a server computer can simultaneously provide digital content to multiple clients connected to the server via a wired and/or wireless network. The clients connectable to such a server may include a personal computer, a laptop computer, a handheld computing device, a wireless phone, and/or any other computing device capable of receiving digital content from the server computer and outputting the received content to an output device (e.g., a monitor, a television set, a stereo, etc.). The output device may be distinct from or integrated with the client computing device connected to the server computer.

In general, each client in a network environment can initiate its own content access session with the server computer. During a session, the client typically maintains control of the content being accessed. For example, if the content is a slideshow of digital photos, the client has control as to which photos to include in the slideshow, when to advance to the next photo, when to stop the slideshow, etc.

In some cases, a client in a session may wish to obtain control over another session. For example, a parent may wish to obtain control over the content his or her child is accessing.

Thus, in the context of digital content access sessions, a market exists for providing a method and system to allow a client in one session to obtain control over a different session initiated by another client.

SUMMARY

An exemplary method for transferring control during digital content access sessions comprises initiating a first session for a first client, initiating a second session for a second client, receiving a request from the second client to obtain control over the first session, and enabling the second client to obtain control by synchronizing the first and second sessions and removing control capabilities from the first session.

An exemplary apparatus is connectable to multiple client devices for providing the devices access to digital content. The apparatus comprises a microprocessor and a memory which are configured to transfer control during digital content access sessions. The memory includes logic instructions executable by the microprocessor to initiate a first session for a first client, initiate a second session for a second client, receive a request from the second client to obtain control over the first session, and enable the second client to obtain control by synchronizing the first and second sessions and removing control capabilities from the first session.

Other embodiments and implementations are also described below.

DETAILED DESCRIPTION

I. Overview

Exemplary techniques are described for transferring control from one digital content access session to another digital content access session.

Section II describes exemplary network systems for providing multiple digital content access sessions.

Section III describes exemplary digital content access sessions.

Section IV describes an exemplary transfer of control from one digital content access session to another session.

Section V describes exemplary processes for transferring control.

Section VI describes exemplary applications of the exemplary processes.

Section VII describes an exemplary computing environment.

Figure 1:
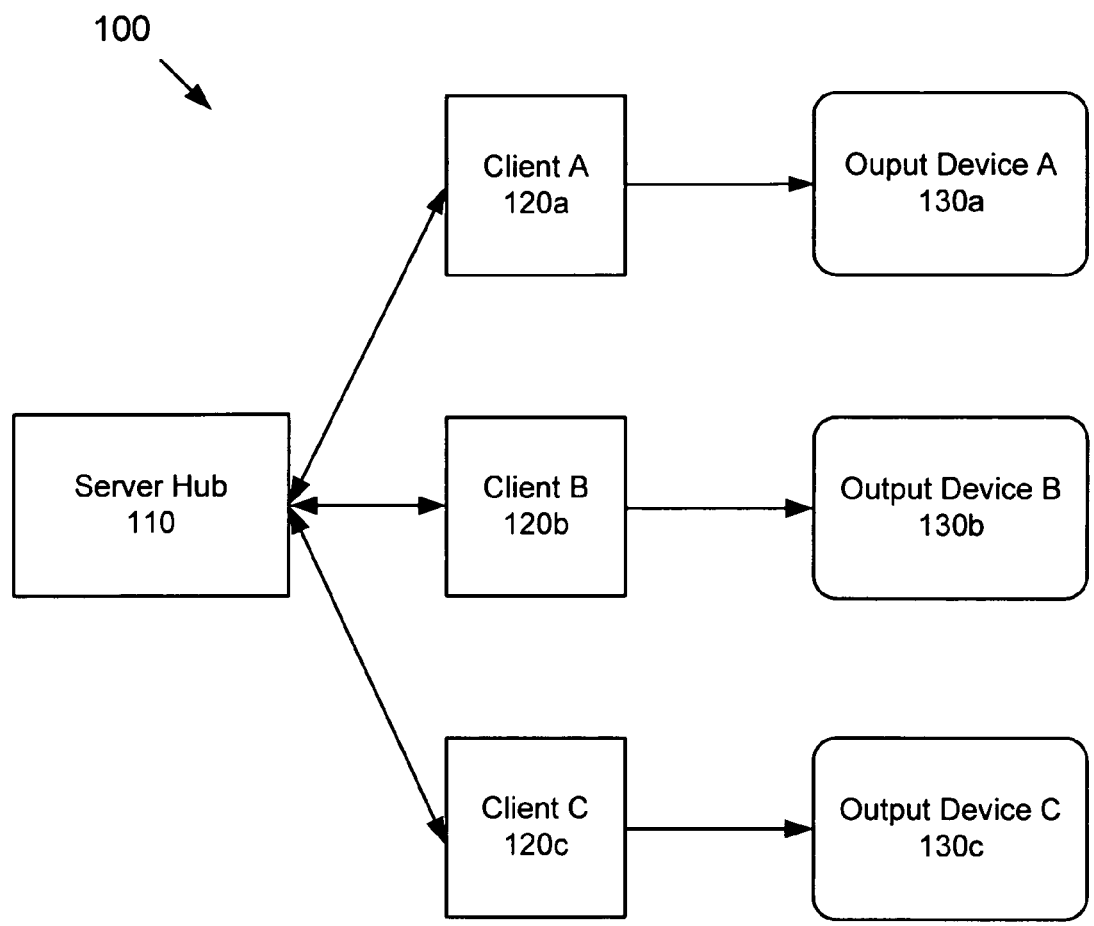
FIG. 1 illustrates an exemplary local area network system for providing multiple digital content access sessions.
Figure 3:
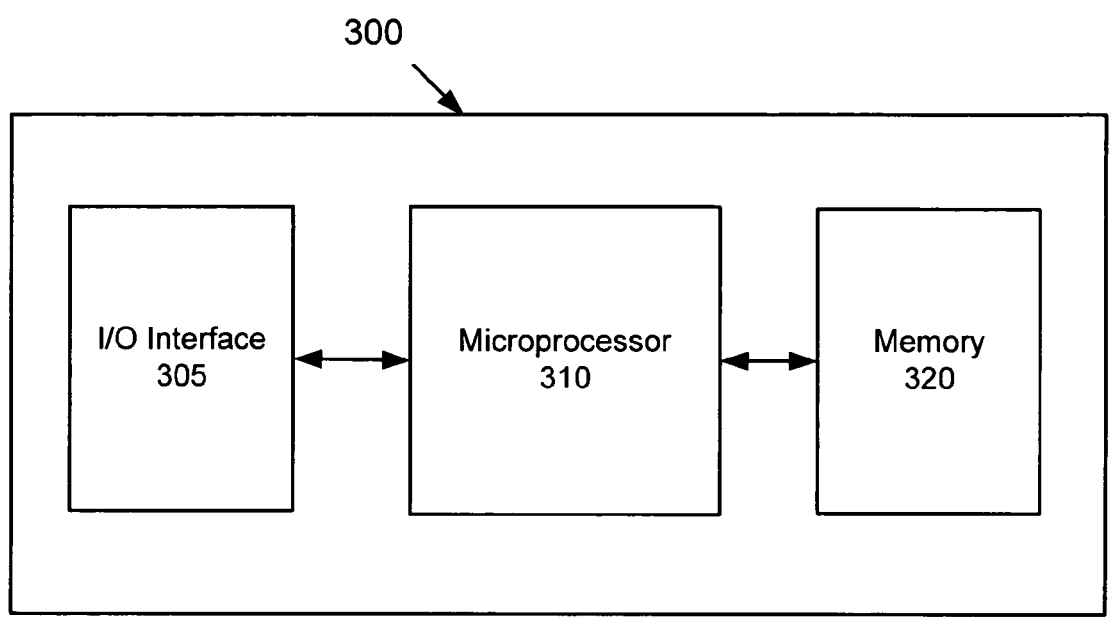
FIG. 3 illustrates an exemplary server for providing multi-session content access.

II. Exemplary Network Systems for Providing Multiple Content Access Sessions FIG. 1 illustrates an exemplary network system 100 for providing multiple content access sessions via a local area network. The system 100 includes a server 110 accessible by multiple clients (e.g., clients A-C 120a-120c), via a wired and/or wireless network. The number of clients illustrated is merely exemplary. Those skilled in the art will recognize that more or less clients can be connectable to the server 110 depending on design choice. In an exemplary implementation, each client can be connected to one or more output device(s) for displaying or otherwise outputting digital content obtained from the server 110. Alternatively, output devices can be integrated into the client computers. In the exemplary system 100, each client 120a-120b is connected to a respective output device 130a-130b for outputting digital content. The server 110 receives requests from the clients 120a-120b and provides requested digital content in response to the requests. An exemplary server 110 is illustrated in FIG. 3 and will be described in more detail below.

In an exemplary implementation, the exemplary system 100 can be implemented within a building (e.g., a home) to provide local access to digital content.

Figure 2:
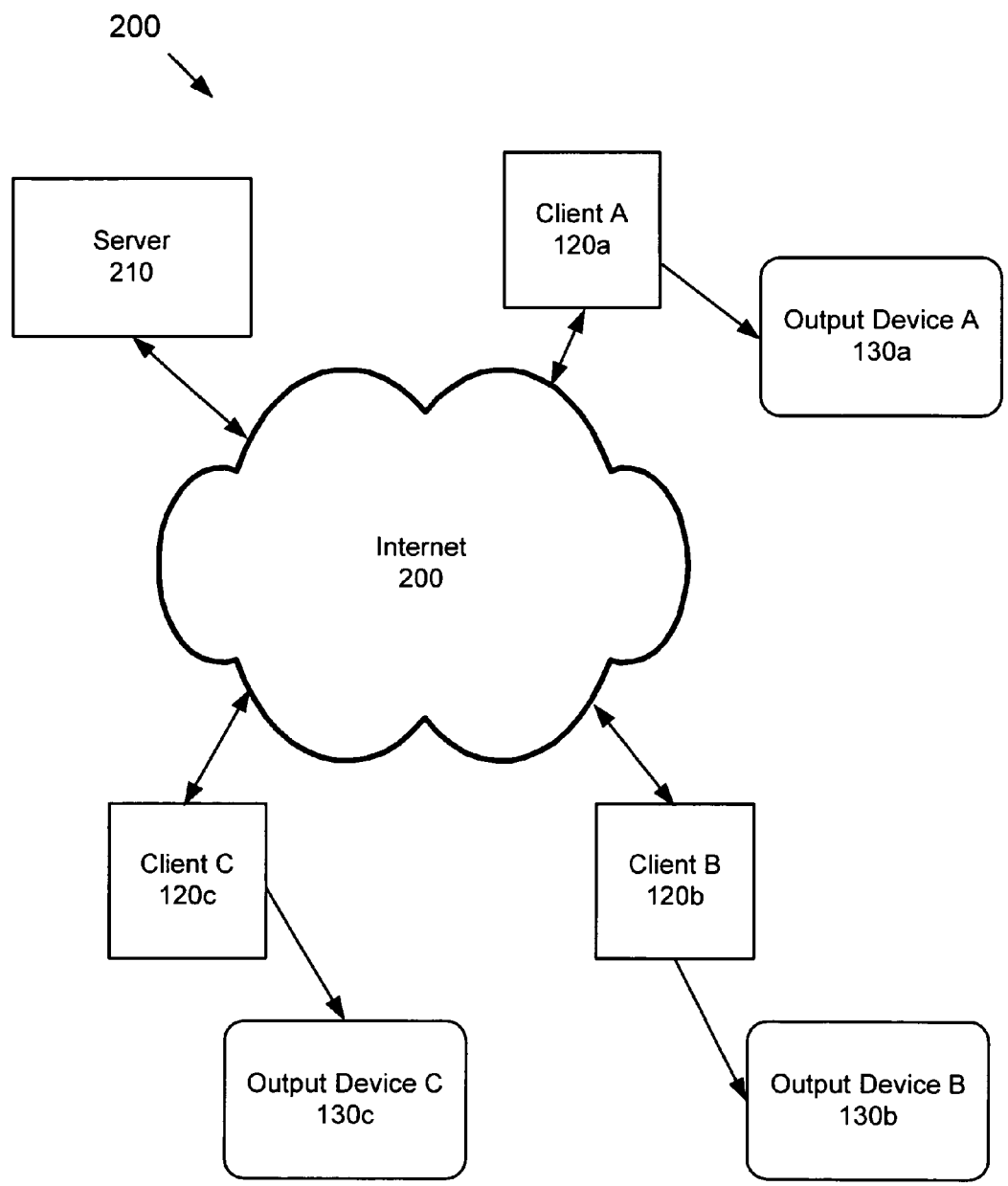
FIG. 2 illustrates an exemplary wide area network system for providing multiple digital content access sessions.

FIG. 2 illustrates another exemplary network system 200 for providing multiple content access sessions via a wide area network, such as the Internet. The system 200 includes a server 210 which is accessible, over the Internet, by multiple clients 120a-120c. Each client can be connected to one or more output device(s) (130a-c) for displaying or otherwise outputting digital content obtained from the server 210. In the exemplary system 200, each client may include a browsing application for accessing the server 210 via the Internet.

For ease of explanation, the various exemplary embodiments described herein will be presented in the context of the exemplary system 100. Those skilled in the art will recognize that the exemplary embodiments can also be implemented in other systems, such as exemplary system 200.

FIG. 3 illustrates an exemplary server 300 which may be used in the system 100 or the system 200 as the server 110 or the server 210. The server 300 includes an input/output interface 305, a microprocessor 310, and a memory 320. In an exemplary implementation, digital content is stored in the memory 320. In another exemplary implementation, digital content may also (or alternatively) be stored in an external memory (not shown) accessible by the microprocessor 310. The server 300 may reside in a single computer or in multiple computers connected by a network (e.g., in a distributed network environment).

Server software for receiving requests to access digital content and responding to the requests are well known in the art and commercially available, and need not be described in greater detail herein. In an exemplary implementation, such server software can be loaded in from the memory 320 to be executed by the microprocessor 310. In one implementation, the server software may be modified by the exemplary embodiments described herein to allow one client control over another client's session. In another implementation, a plug-in (or additional) software developed in accordance with the exemplary embodiments described herein may be installed in the memory 320 and be executable by the microprocessor 310 to complement the existing server software.

Figure 4:
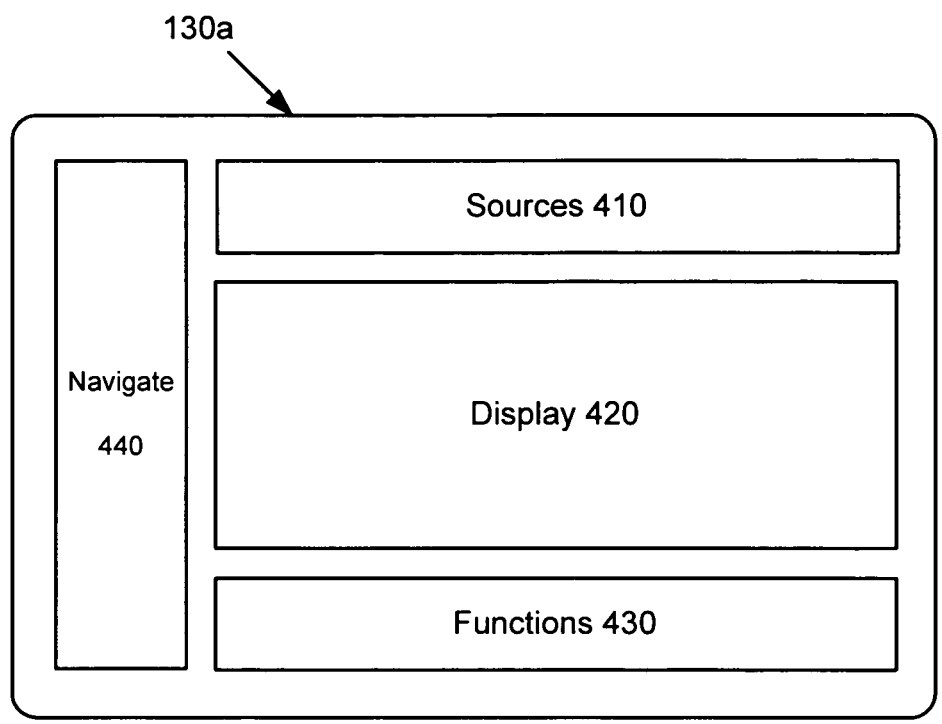
FIG. 4 illustrates an exemplary display screen of an output device during a content access session.

FIG. 4 illustrates an exemplary output device 130a connectable to a client device (e.g., the client 120a, 120b, or 120c, etc.). The exemplary output device depicted in 130a is a visual display device. Those skilled in the art will recognize that other types of output devices capable of outputting non-visual content (e.g., audio content) may also be implemented in accordance with the exemplary embodiments described herein. The output device 130a includes multiple sub-windows in the main display window. The sub-windows may include a sources window 410 for displaying the source of the digital content currently being accessed, a display window 420 for displaying the accessed content, a functions window 430 for displaying interactivity functions during the display of the accessed content, and a navigation window 440 for displaying navigation capabilities. In this exemplary implementation, if video content is being accessed, the display window 420 displays the video, the sources window 410 displays where the video content is stored, the functions window 430 displays functions such as fast-forward, rewind, pause, stop, and/or other functions to enable a user to interact with the video being displayed, and the navigation window 440 displays navigation controls to enable a user to navigate to another digital content during viewing of the accessed video. The output device illustrated is merely exemplary. Those skilled in the art will recognize that other display configurations (or other output configurations) may be implemented in accordance with design choice. For example, some of the control sub-windows may be eliminated and/or other types of control windows may be added.

III. Exemplary Multiple Digital Content Access Sessions

Figure 5:
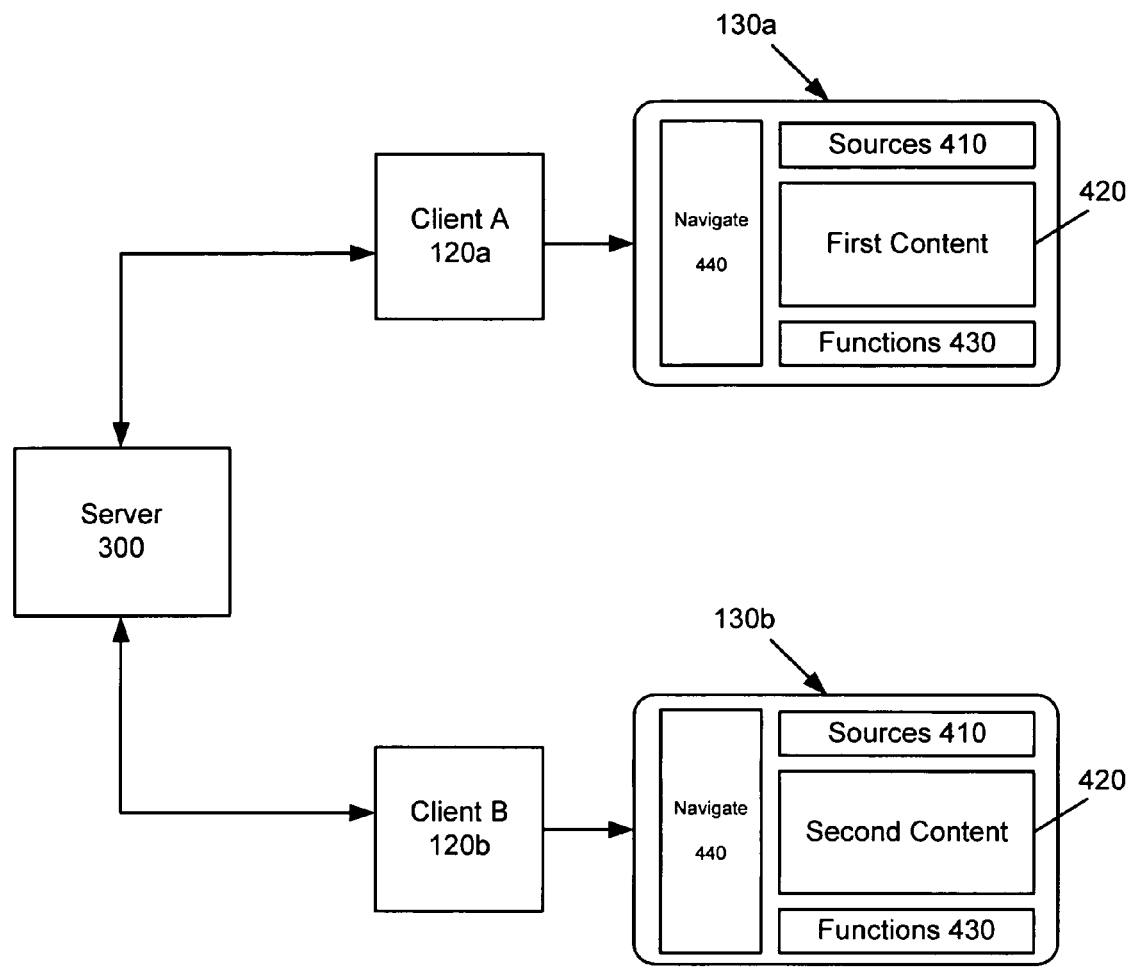
FIG. 5 illustrates an exemplary representation of multiple digital content access sessions.

FIG. 5 illustrates exemplary multiple sessions for accessing digital content. In this example, client A (120a) initiates a first session by sending a request to the server 300 to access a first item of digital content, and client B (120b) initiates a second session by sending a request to the server 300 to access a second item of digital content. Alternatively, a session can be automatically initiated when a client computing device powers-on. The server 300 may respond by sending the first item of digital content to client A (120a) and the second item of digital content to client B (120b). The items of content are then outputted (e.g., displayed) respectively on output devices 130a and 130b.

For instance, the first item of digital content can be displayed in the display window 420 of device 130a, and the second item of digital content can be displayed in the display window 420 of device 130b.

The sessions illustrated are merely exemplary. Those skilled in the art will recognize that more sessions may be operating concurrently at any given time depending on the design of the system.

IV. An Exemplary Transfer of Control During Multiple Sessions

Figure 6:
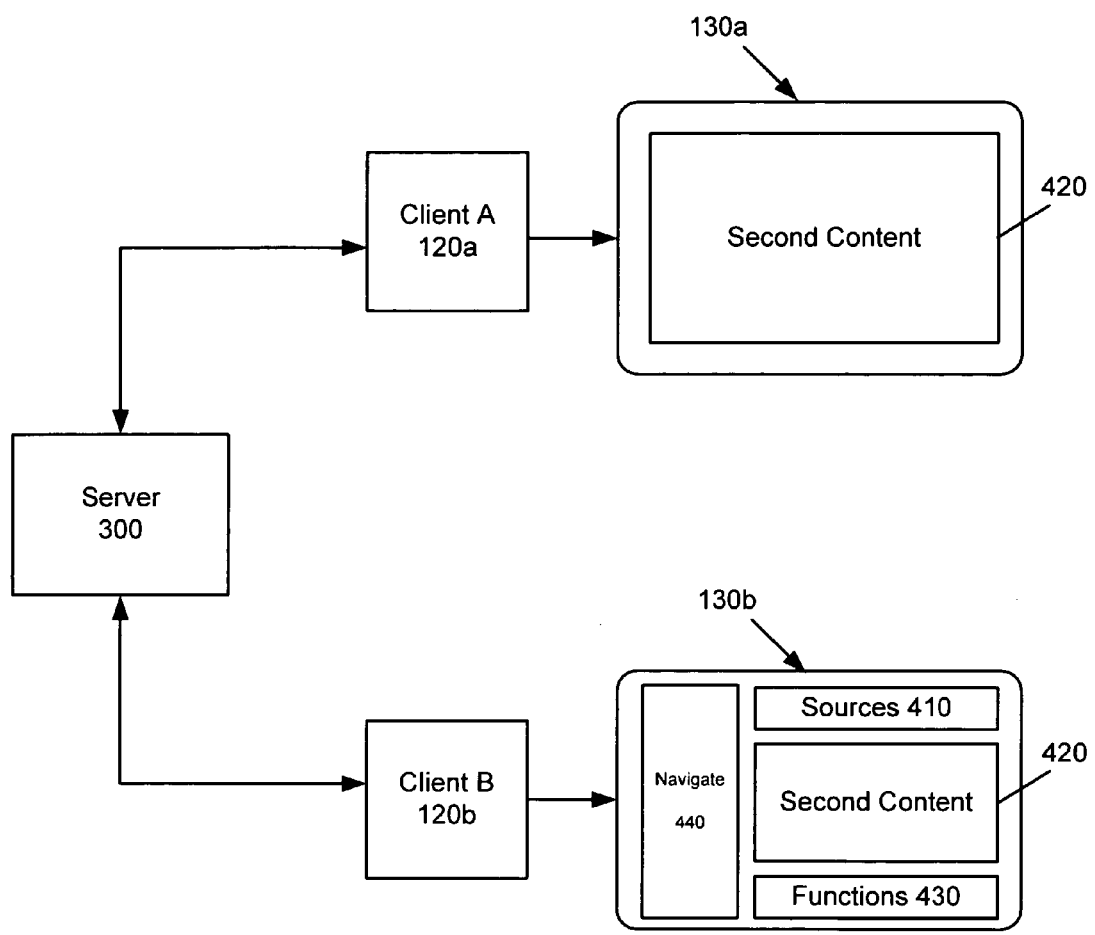
FIG. 6 illustrates an exemplary representation of a transfer of control from one digital content access session to another session.

FIG. 6 illustrates an exemplary transfer of control from client A (120a) to client B (120b) of FIG. 5.

In an exemplary implementation, when client B (120b) initiates the second session with the server 300 (e.g., by turning on the power, by making a specific request to access content, etc.) the server 300 may recognize that client B (120b) has authority to take control over other sessions. In this implementation, the server 300 may indicate to client B (120b) any other active sessions and enable client B (120b) to obtain control over any of the indicated active sessions (e.g., by making a request to do so). For example, a screen may be displayed on the client output device 130a indicating the other active sessions.

One or more clients who are able to access the server 300 may have authority to obtain control over another client's session in accordance with any specified control-transfer policy (e.g., default policy, predefined policy, or dynamically defined policy). For example, in a home-based network, both parents may have authority to obtain control over their children's sessions on the network, but neither parent can have control over the other parent's session. Depending on the specific implementation, a system administrator may override any default policy and set its own policies.

The control policy may be device-specific, user-specific, or a combination thereof. For example, a policy may allow all handheld devices control over non-handheld devices. In a device-specific policy, a unique device identification number (e.g., serial number, MAC address, IP address, etc.) may be used to grant control authority to certain other devices regardless of the user. In a user-specific policy, each user may be identified by a unique log-in name and/or password which are usable by the server 300 to determine which user should have control authority regardless of the device being used. Other control policies (hierarchical or otherwise) may be determined depending on design choice.

In an exemplary implementation, client B (120b) requests to obtain control over the session of client A (120a). The server 300 determines client B's eligibility to obtain control. If eligibility is confirmed, the server 300 may grant the request by enabling client B to control client A's session. In an exemplary implementation, the server 300 synchronizes the session of client A (120a) and the session of client B (120b). In one implementation, the server 300 may "pull" the content of session A to session B. In another implementation, the server 300 may "push" the content of session B to session A. An exemplary synchronization process will be described below with reference to FIG. 8. In addition, the server 300 may remove control capabilities from client A (120a). In one implementation, the server 300 may remove all visual representation of the control windows (e.g., 410, 430, and 440) from the display screen of the output device 130a. In this implementation, the user of client A (120a) will realize that control over its session has been transferred to someone else. In this implementation, as illustrated in FIG. 5, the display window 420 of the output device 130a may increase in size to fit the entire display screen. In another implementation, the server 300 may not remove the visual representation of the control windows but merely disable their functions. This may be a desirable implementation if client B (120b) does not wish to let client A know that client A has lost control. In this implementation, when client A attempts to apply any control function (e.g., by pushing a button to fast-forward), the control command will not be executed by the server 300.

In addition to a control policy, a system may also include one or more content policy. A content policy may be a default policy, a customized policy (e.g., determined by one or more client), or may be dynamically determined based on client input. In an exemplary implementation, a content policy defines what type of content, and/or which items of content, can be obtained by each client. In the above example, content being provided to session B (which is now controlling session A) may not necessarily be presented to session A if such content is prohibited by the content policy associated with session A. In one implementation, content policies may be amended by each client or by certain clients (e.g., the system administrators, etc.).

V. An Exemplary Process for Transferring Control

Figure 7:
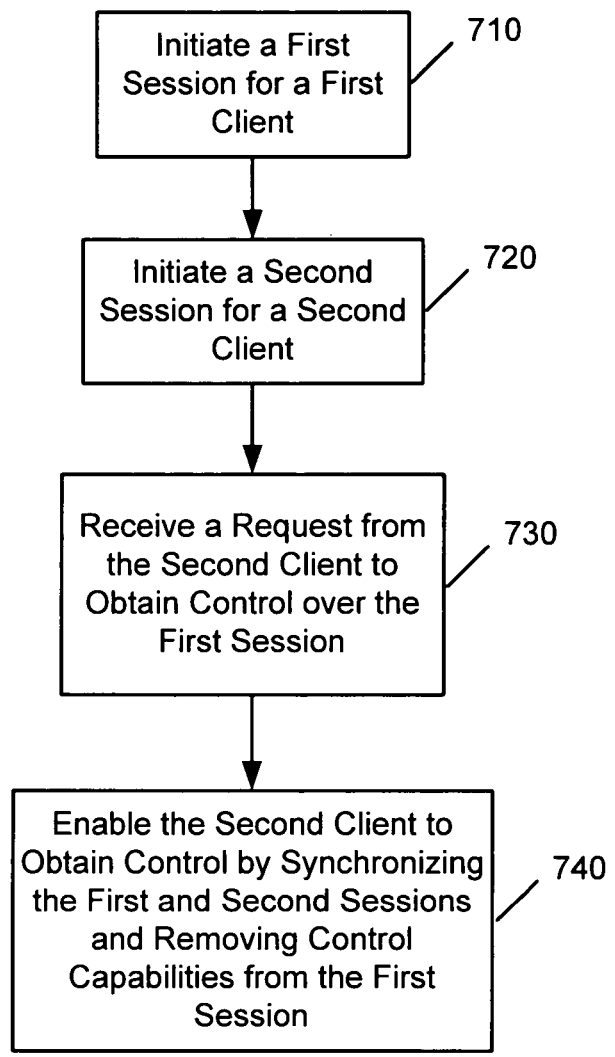
FIG. 7 illustrates an exemplary process for transferring control from one digital content access session to another session.

FIG. 7 illustrates an exemplary process for transferring control from one client to another client during multiple digital content access sessions.

At step 710, a first session is initiated by the server 300 for a first client device. For example, the session could be automatically initiated upon power-on of the client device (connected to the server 300). In another implementation, the session may be initiated upon receiving a request from the client device to begin a session or to access certain content. In one implementation, upon initiation of the first session, the server 300 may register the first client as starting the first session and store this information in a database with a timestamp. During the session, as the first client requests and obtains various items of content, changes in the state of the first session (e.g., what item of content is being provided, parameters of the display, etc.) can also be stored in the database with appropriate timestamps.

At step 720, a second session is initiated by the server 300 for a second client device. In an exemplary implementation, similar to the first session, upon initiation of the second session, the server 300 may register the second client as starting the second session and store this information in a database with a timestamp. During the session, as the second client requests and obtains various items of content, changes in the state of the second session (e.g., what item of content is being provided, parameters of the display, etc.) can also be stored in the database with appropriate timestamps. The database for storing the information relating to the first and second sessions may be the same or different databases accessible by the server 300. Other sessions initiated by other clients may also be similarly managed by the server 300.

At step 730, a request from the second client to obtain control over the first session is received by the server 300. In an exemplary implementation, the server 300 may authenticate or otherwise verify the second client's eligibility for obtaining control over the first session.

At step 740, the second client is enabled to obtain control over the first session. In an exemplary implementation, the server 300 synchronizes the first and second sessions and removes control capabilities from the first session. In one implementation, the server 300 either "pulls" the state of the first session to the second session or "pushes" the state of the second session onto the first session to synchronize the two sessions. An exemplary synchronization process will be described below with reference to FIG. 8. Other synchronization techniques known in the art may be alternatively applied by the server 300. The control capabilities of the first session can be removed by disabling control functions, removing the visual representations of the control functions, and/or by applying other control elimination techniques.

After the second client has obtained control over the first session, a user at the first session will now experience the content which the second client wishes him to experience (e.g., see, hear, etc.) as permitted by any applicable content policy. In an exemplary implementation, the state of the second session is continuously pushed onto the first session unless instructed by the second session otherwise. In another exemplary implementation, the states of the second session are not being pushed onto the first session until instructed by the second session otherwise. In other words, after the initial synchronization, the state of the first session remains static until the second session instructs the server 300 to push the second session's current state onto the first session.

In one implementation, a control attribute can be set (after the two sessions have synchronized) to indicate whether the states of the second session are to be pushed to the first session. For example, if the attribute is set to OFF, the second session's state is not pushed to the first session. If the attribute is set to ON, the second session's state is pushed to the first session. This way, the second client can toggle between setting the control attribute to ON or OFF to indicate whether a state of the second session is to be pushed to the first session.

Figure 8:
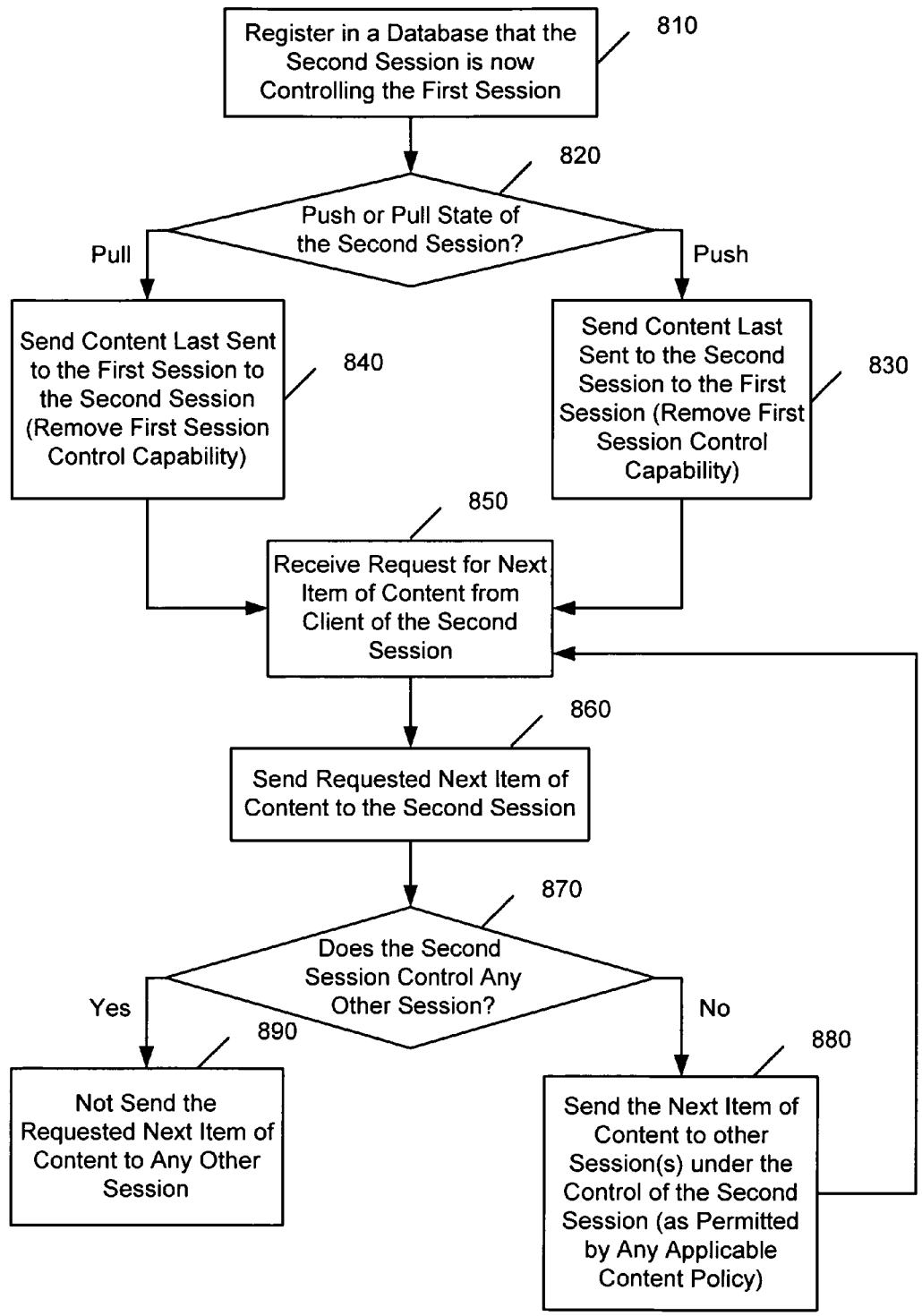
FIG. 8 illustrates an exemplary synchronization process to transfer control from one digital content access session to another session.

FIG. 8 illustrates an exemplary synchronization process performed by the server 300 in response to a second session's request to control a first session.

At step 810, after appropriate authentication or verification process (as necessary) and granting of control of the first session to the second session, a server 300 may register in a database that the second session is now in control of the first session.

At step 820, the server 300 determines whether to push or pull the state of the second session. This determination may be based on a default setting, a customized setting, or be dynamically determined based on client selection.

If the server 300 determines to push the content of the second session, then at step 830, the server 300 sends the content last sent to the second session to the first session. In an exemplary implementation, the server 300 may access a database containing content accessed by the second session and compare the timestamps to determine the most recently accessed content. In an exemplary implementation, the server 300 also removes any control capabilities from the first session.

If the server 300 determines to pull the content of the second session, then at step 840, the server 300 sends the content last sent to the first session to the second session. In an exemplary implementation, similar to the push process, the server may access a database containing content accessed by the first session and compare the timestamps to determine the most recently accessed content. In an exemplary implementation, the server 300 also removes any control capabilities from the first session.

After steps 830 or 840, the state of the two sessions is now the same, or synchronized.

At step 850, the server 300 receives a request for a next item of content from the second client.

At step 860, the server 300 sends the requested item of content to the second session.

At step 870, the server 300 determines whether the second session has control over any other sessions (e.g., the first session).

If yes, and permitted by any applicable content policy, at step 880, the sever 300 also sends the requested item of content to the controlled session (e.g., the first session). The process continues by returning to step 850.

If no (e.g., if the second session had already terminated its control over the first session), at step 890, the requested content is not sent to any other session.

The second session's control over the first session can be terminated by sending a termination request to the server 300. In an exemplary implementation, upon receipt of a termination request, the server 300 may reinstate control capabilities of the first session.

VI. Exemplary Applications

Several exemplary applications of the exemplary embodiments set forth herein are described below.

In a first exemplary application, a host may wish to present a slide show of photos taken of a particular destination (e.g., Hawaii) to an audience (e.g., of friends). A client computer connected to a large-screen output device (e.g., a television set) initiates a first session with the server 300. The host holding a handheld device (e.g., an iPaq) initiates a second session with the server 300. The host requests to take control over the first session. The server 300 enables the host to take control over the first session by pushing the state of the second session onto the first session. For example, if the host is viewing a photo of a Hawaiian sunset on his iPaq, the large-screen output device now displays the same photo. Next, depending on a predetermined policy or by dynamic control of the host, one or more other photos being viewed on the iPaq may also be pushed onto the large-screen output. Typically, a host would not wish the audience to view the navigation screens for getting to any particular content. For example, if the host needs to navigate to a different directory to retrieve another similar photo, the navigation screens can be hidden from the audience viewing the large-screen display (while being visible to the host on the iPaq). Thus, the audience viewing the large-screen display (i.e., of the first session) experiences (e.g., see) selective content determined by the host.

In a second exemplary application, in a home entertainment system, a parent may wish to obtain control over a child's content access session. At power-on of a parent's device (e.g., the server 300 can recognize that a device is a parent device and/or require the user to login as a parent), the server 300 can indicate other active sessions to the parent's device. The parent can ignore the other sessions and access digital content, or the parent can request to obtain control over another active session. If the parent chooses the latter, the server 300 may determine the parent's eligibility to obtain control over the selected session before granting control. In one implementation, the control windows on the display device of the controlled session may be disabled. In this implementation, the user of the controlled session may not know that the parent now has control over its session until he/she tries to use the control functions. In another implementation, the control windows on the display device of the controlled session may disappear. In this implementation, the user of the controlled session will instantly recognize that another person on the network now has control over his/her session.

In a third exemplary application, a computing device outputting content onto a public display screen, e.g., at a train station, may initiate a first session with a server 300. Multiple customers at the train station may each have a handheld (or other computing devices) that may also independently initiate its own session with the server 300 when each device is within the vicinity of the wireless network serviceable by the server 300. A customer with a handheld device can request to take control of the public display screen. For example, each customer may wish to use the public display screen to map out the train route to a desired destination. When one of the customers obtains control over the public display screen, the state of the computing device outputting onto the public display screen may be pulled by the handheld device so that the customer navigating on the handheld device can view a larger representation of the displayed content (e.g., a map) while navigating through the content using the handheld device.

In a fourth exemplary application, a digital video player (e.g., a DVD player, a personal video recorder, a media hub, etc.) is connected at one end to a server 300 and connected at another end to an output display which is showing a menu of keyframes or chapter titles corresponding to video segments of available videos. A client holding a handheld remote control having a display surface may independently initiate its own session with the server 300 then request to obtain control over the session of the digital video player. If the request is granted by the server 300, the client can view the menu (and make selections on the menu) pulled to the display surface of the handheld remote control. In an exemplary implementation, the menu originally displayed on the output display may be removed or disabled by the server 300.

The exemplary applications described above are merely illustrative. Those skilled in the art will recognize that other applications may be implemented in accordance with the exemplary embodiments described herein depending on design choice.

VII. An Exemplary Computing Environment

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

VIII. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A method for transferring control during digital content access sessions, comprising:
   initiating a first session between a first client and a server, said first session comprising selected content being output from said server to said first client;
   initiating a second session between a second client and said server;
   receiving a request in said server from said second client to obtain control over said first session; and
   with said server, enabling said second client to obtain control by:
      synchronizing said content from said server outputted in said first and second sessions, such that said first and second clients then receive the same content from said server; and
      removing control capabilities from said first session;
   in which said first session, said second session, or combinations thereof are initiated automatically when a corresponding computing device powers-on; and
   in which said first client comprises a display device and said selected content from said server comprises a presentation being displayed on said display device under control of said second client which comprises a handheld device.

2. The method of claim 1, wherein said enabling includes automatically confirming said second client's eligibility to obtain control over said first session.

3. The method of claim 2, wherein said confirming is based on a control policy.

4. The method of claim 1, wherein said receiving includes performing an authentication process to verify that said second client is eligible to obtain control of said first session.

5. The method of claim 4, wherein said authentication process includes verifying a user identification and a password.

6. The method of claim 4, wherein said authentication process includes verifying a unique device identification.

7. The method of claim 1, wherein said enabling includes pushing a state of said second session to said first session, such that content selected for output from said server to said second client in said second session replaces selected content being output by said server to said first client in said first session.

8. The method of claim 1, wherein said enabling includes pulling a state of said first session to said second session, such that content being output by said server to said first client in said first session is also output to said second client in said second session.

9. The method of claim 1, wherein said removing control includes removing a control window of said first session.

10. The method of claim 1, wherein said removing control includes disabling control functions of said first session.

11. The method of claim 1, wherein said first and second sessions can independently access digital content at a server.

12. The method of claim 1, further comprising:
   pushing certain content from said second session to said first session based on a content policy, such that said content being pushed replaces content previously selected and being output in said first session.

13. The method of claim 1, further comprising:
   hiding certain content of said second session from said first session based on a content policy.

14. The method of claim 1, further comprising:
   continuously pushing a state of said second session onto said first session unless instructed by said second session otherwise.

15. The method of claim 1, further comprising:
   selectively pushing a state of said second session onto said first session based on an instruction from said second session.

16. The method of claim 1, wherein said first client comprises a public display device located in a public place and said second client comprises a mobile device.

17. A server, comprising:
   a microprocessor; and
   a memory, said memory including logic instructions executable by said microprocessor to:
      initiate a first session with a first client, said first session comprising selected content being output from said server to said first client;
      initiate a second session with a second client when a computing device corresponding to said second client powers-on, in which said initiation of said second session comprises:
         authenticating said second client; and
         recognizing that the second client has authority to control the first session;
      receive a request from said second client to obtain control over said first session; and
      enable, said second client to obtain control by:
         synchronizing said content from said server outputted in said first and second sessions, such that said first and second clients then receive the same content from said server; and
         removing control capabilities from said first session;
      in which said first client comprises a display device and said selected content from said server comprises a presentation being displayed on said display device under control of said second client which comprises a handheld device.

18. The server of claim 17, further comprising instructions to confirm said second client's eligibility to obtain control over said first session.

19. The server of claim 17, further comprising instructions to perform an authentication process to verify that said second client is eligible to obtain control of said first session.

20. The server of claim 17, wherein said synchronizing includes pushing a state of said second session to said first session, such that content selected for output from said server to said second client in said second session replaces selected content being output by said server to said first client in said first session.

21. The server of claim 17, wherein said synchronizing includes pulling a state of said first session to said second session, such that content being output by said server to said first client in said first session is also output to said second client in said second session.

22. The server of claim 17, wherein said removing control includes removing a control window of said first session.

23. The server of claim 17, wherein said removing control includes disabling control functions of said first session.

24. A non-transitory computer-readable medium containing instructions executable by a microprocessor for transferring control during digital content access sessions, said instructions, when executed:
   initiate a first session with a first client, said first session comprising selected content being output from said microprocessor to said first client;
   initiate a second session with a second client when a computing device corresponding to said second client powers-on, in which said first client comprises a display device and said selected content from said server comprises a presentation being displayed on said display device under control of said second client which comprises a handheld device and in which said initiation of said second session comprises:
  authenticating said second client; and
  recognizing that the second client has authority to control the first session;
receive a request from said second client to obtain control over said first session; and
enable said second client to obtain control by:
  synchronizing said content from said server outputted in said first and second sessions, in which synchronizing said content is based on:
    at least one content policy; and
    at least one device policy which indicates that a first type of computing device controls a second type of computing device; and
  removing control capabilities from said first session.

25. The computer-readable medium of claim 24, further comprising instructions that, when executed, determine confirm said second client's eligibility to obtain control over said first session.

26. The computer-readable medium of claim 24, further comprising instructions that, when executed, perform an authentication process to verify that said second client is eligible to obtain control of said first session.

27. The computer-readable medium of claim 24, wherein said instructions to enable include instructions that, when executed, push a state of said second session to said first session.

28. The computer-readable medium of claim 24, wherein said instructions to enable include instructions that, when executed, pull a state of said first session to said second session.

29. An apparatus for transferring control during digital content access sessions, comprising:
  means for initiating a first session with a first client, said first session comprising selected content being output from said apparatus to said first client;
  means for initiating a second session with a second client;
  means for receiving a request from said second client to obtain control over said first session; and
  means for enabling said second client to obtain control by:
    synchronizing, based on at least one content policy, said content from said server outputted in said first and second sessions; and
    removing control capabilities from said first session
  in which said first client comprises a display device and said selected content from said server comprises a presentation being displayed on said display device under control of said second client which comprises a handheld device.

30. A method for transferring control during digital content access sessions, comprising:
  initiating a first session between a first client and a server;
  initiating a second session between a second client and said server;
  receiving a request in said server from said second client to obtain control over said first session; and
  with said server, enabling said second client to obtain control by:
    synchronizing, based on at least one device policy which indicates that a first type of computing devices controls a second type of computing device, said content from said server outputted in said first and second sessions, such that said first and second clients then receive the same content from said server; and
    removing control capabilities from said first session
  in which said first client comprises a display device and said selected content from said server comprises a presentation being displayed on said display device under control of said second client which comprises a handheld device.

* * * * *